United States Patent
Ichimura (10) Patent No.: US 6,219,147 B1
(45) Date of Patent: Apr. 17, 2001

(54) DIGITAL MULTI-FUNCTIONAL MACHINE AND METHOD CAPABLE OF PHOTOCOPYING, PRINTING AND TRANSMITTING FACSIMILE IMAGES

(75) Inventor: Hajime Ichimura, Sakura (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/048,055

(22) Filed: Mar. 26, 1998

(30) Foreign Application Priority Data

Mar. 27, 1997 (JP) .................................................. 9-075795

(51) Int. Cl.[7] .................................................. G41B 15/00
(52) U.S. Cl. .................... 358/1.13; 358/1.15; 358/1.9; 358/261.1; 358/426; 382/232
(58) Field of Search .................................... 395/109, 114; 358/261.1–261.4, 426, 428, 1.9, 1.15, 400, 404, 406, 468; 382/232, 234, 237, 244–246

(56) References Cited

U.S. PATENT DOCUMENTS

| | | | |
|---|---|---|---|
| 5,673,119 | * 9/1997 | Murata | 358/448 |
| 5,682,249 | * 10/1997 | Harrington et al. | 358/433 |
| 5,761,342 | * 6/1998 | Yoshida | 382/234 |
| 5,801,841 | * 9/1998 | Suzuki | 358/433 |
| 5,838,455 | * 11/1998 | Imaizumi et al. | 358/298 |
| 5,872,636 | * 2/1999 | Kohtani et al. | 358/298 |
| 5,894,546 | * 4/1999 | Yoshida | 395/117 |
| 5,956,425 | * 9/1999 | Yoshida | 382/234 |

* cited by examiner

*Primary Examiner*—Edward Coles
*Assistant Examiner*—Mark Wallerson
(74) *Attorney, Agent, or Firm*—Oblon, Spivak, McClelland, Maier & Neustadt, P.C.

(57) ABSTRACT

A digital multi-functional machine and method are disclosed, having at least one of picture reading, printing, and facsimile transmission capabilities, and including a printer for making visible prints in response to a demand for image prints and prints of facsimile transmission. The machine is provided with a data storage unit which is capable of storing image data either in predetermined block unit of pixels for binary image data, or in the form coded by a fixed length block truncation encoder by the block unit of pixels for multiple valued image data.

6 Claims, 8 Drawing Sheets

$L_a = (L_{max} + L_{min})/2$ $L_d = (L_{max} - L_{min})/2$ $P_i = (L_a + 1/2 L_d - (i-1) \times L_d) \quad (i=1\sim2)$

```
for (i=0;i<4;i++)
{
    for (j=0;j<4;j++)
    {
        if(L ij >=P1 )         { φ ij =11; }
        else if(L   >=L1 )     { φ ij =10; }
        else if(L ij >=P2 )    { φ ij =00; }
        else                   { φ ij =01; }
    }
}
```

FIG. 9
PRIOR ART $L_{ij}$ (16 × 1 bytes)=16 bytes  →  $\phi_{ij}$ (16 × 2b bits)+$L_a$(1 byte)+ $L_d$(1 byte)= 6 byte

BEFORE CODING  　　　　　AFTER CODING

FIG. 10
PRIOR ART

```
for (i=0;i<4;i++)
{
    for (j=0;j<4;j++)
    {
        if(φij  ==11)              { L*ij=L a+3/4Ld; }
        else if(φij  ==10)   { L*ij=L a+1/4Ld; }
        else if(φij  ==10)   { L*ij=L a-1/4Ld; }
        else                       { L*ij=L a-3/4Ld; }
    }
}
```

DIGITAL MULTI-FUNCTIONAL MACHINE AND METHOD CAPABLE OF PHOTOCOPYING, PRINTING AND TRANSMITTING FACSIMILE IMAGES

BACKGROIIND OF THE INVENTTION

1. Field of the Invention

The present invention relates to methods and multi-functional machines having photocopying, printing, and facsimile transmission capabilities, and more particularly to the storage and processing of image data in the multi-functional machines.

2. Description of the Related Art

Figure 5:
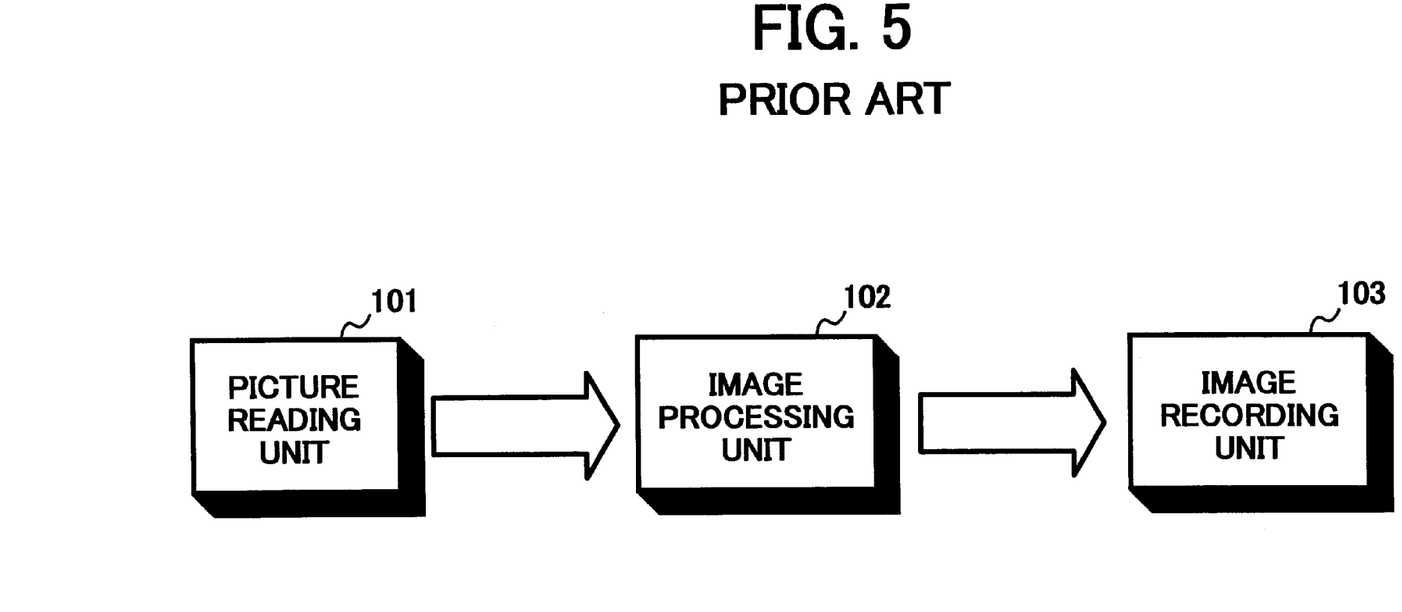
FIG. 5 is a block diagram of a system configuration of a conventional digital photocopying machine.

Photocopying machines that are capable of processing digital image data conventionally include a picture reading unit 101, an image processing unit 102 and an image recording unit 103, as illustrated in FIG. 5.

The picture reading unit 101 performs a reading operation by scanning original documents and producing raw image data. The image processing unit 102 carries out processing procedures on the raw image data necessary to produce satisfactory image data, such as, for example, gamma correction and/or picture quality control for the image data. The image recording unit 103 makes hard-copy prints of the image data by arranging pixels on a suitable support material such as copy sheets.

When processed in digital form, image data may be stored in a storage medium such as, for example, semiconductor memory devices with relative ease, thereby making data processing utilizing the stored image data feasible.

Figure 6:
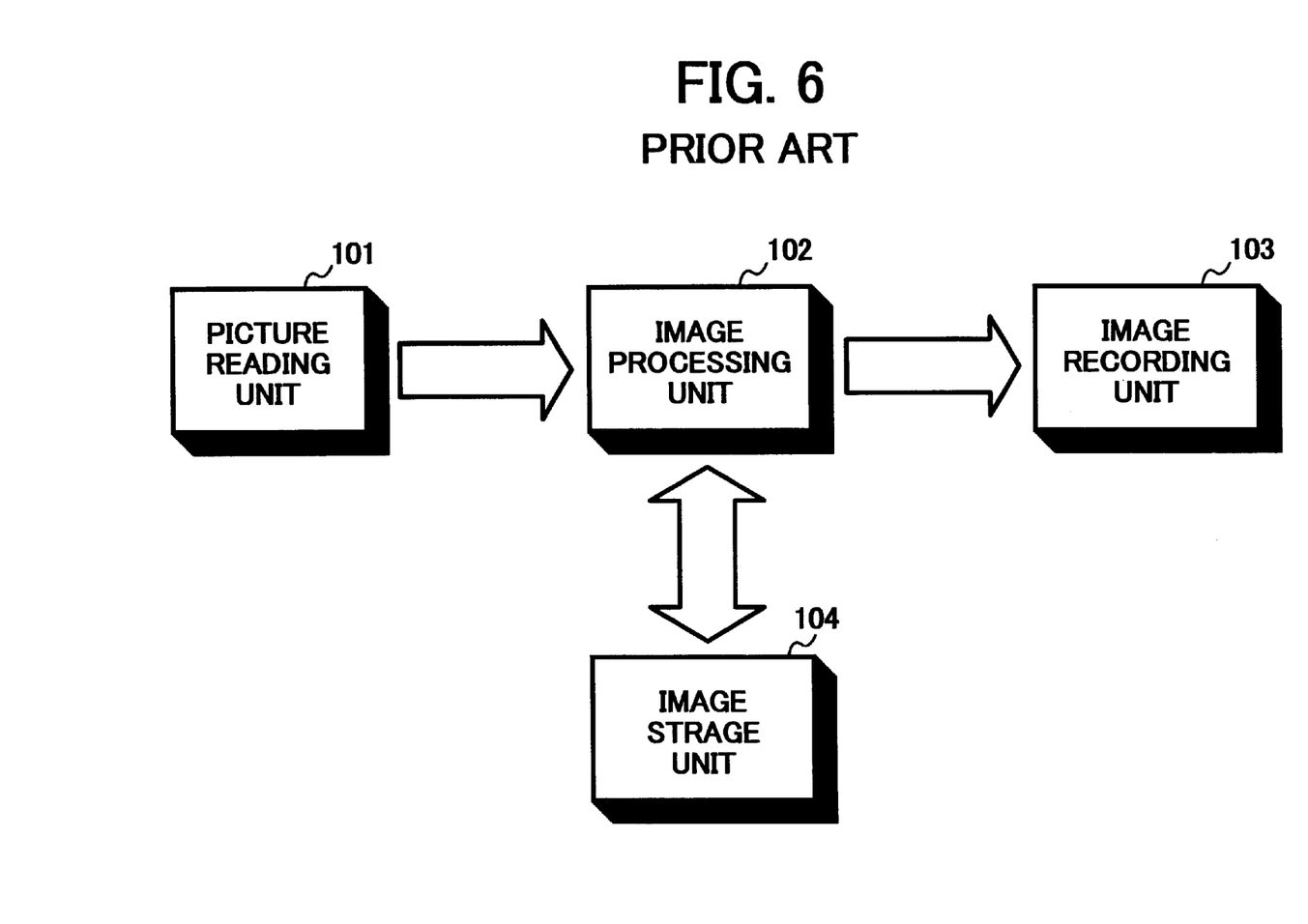
FIG. 6 is a block diagram of the system configuration of a conventional digital photocopying machine shown in FIG. 5, further provided with an image storage unit.

The above-mentioned photocopying machine that includes storage media may be constructed such that image data is exchanged between the image storage unit 104 and the image processing unit 102, as illustrated in FIG. 6.

In other words, image data is read once by the picture reading unit 101 and stored once in the image storage unit 104. Because the image data is stored, a plurality of duplicated copies may be produced from the stored data in response to a request for multi-copy print, by outputting the image data from the image storage unit 104 in place of repeatedly reading original documents for the number of times required. By this construction, the photocopying machine can be operated more quietly without reading the original repeatedly, and also photocopies can be produced more quickly by operating the image recording unit 103 faster than the recording unit 101. In practice, it is known that the image recording unit 103 is designed to be operated faster than the picture reading unit with relative ease. Such photocopying machines are commercially available at the present time.

Furthermore, the image storage unit 104 may also be operated such that image data may be reproduced in a rotated (or reverse) manner by outputting the image data in an order different from that of inputting the image data.

Because of these data processing procedures, image data which are processed in digital photocopying machines are generally required to have high picture quality. Accordingly, image data are categorized in multiple gradations, wherein image data are expressed, for example, by combinations of 8 bits or the gray level of 256.

However, when storing these multiple valued image data without first compressing the data by data compression, a considerable volume of memory is required. Therefore, the image data are conventionally stored succeeding a coding operation and thereby reducing the data volume.

Figure 7:
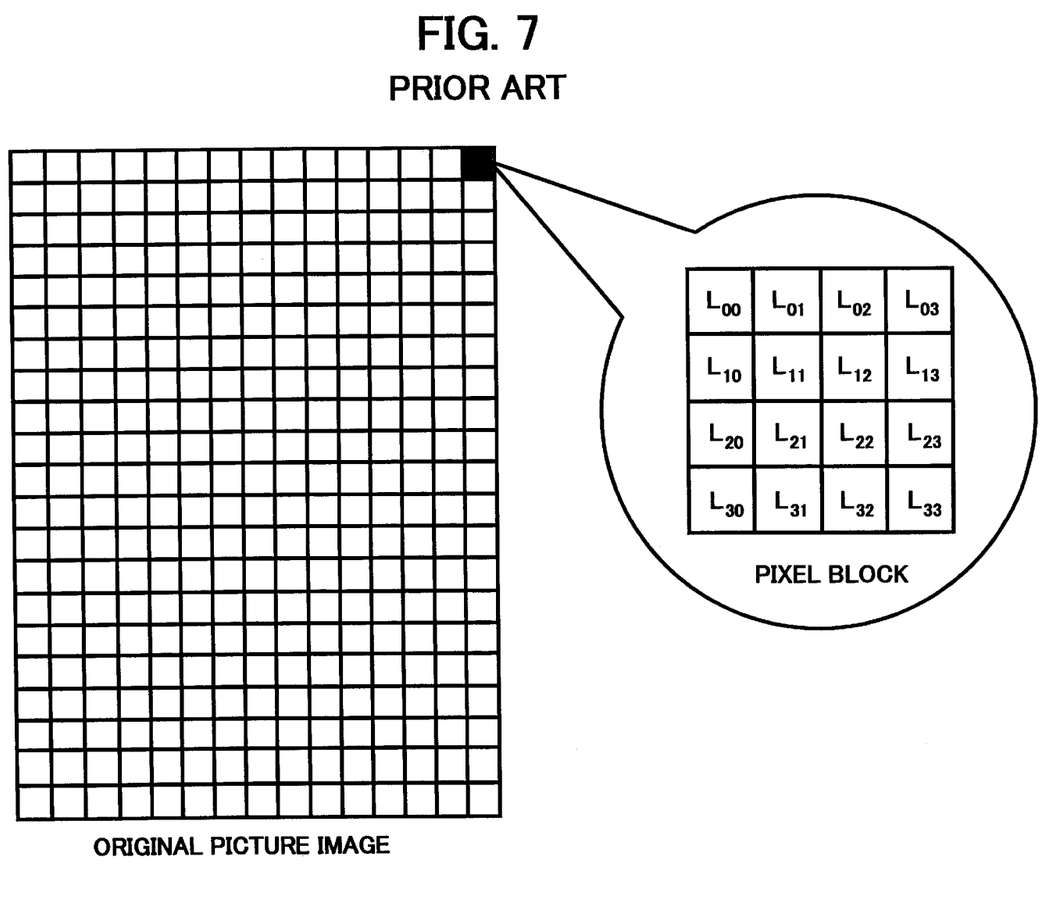
FIG. 7 illustrates one aspect of a fixed length block truncation coding scheme.
Figure 8:
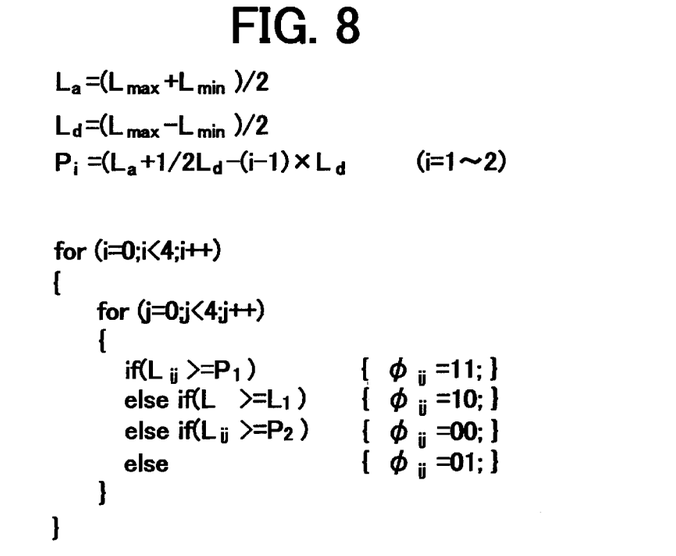
FIG. 8 illustrates a process for the fixed length block truncation coding scheme utilized in the present invention.

As one of the methods of coding the image data and reducing the data volume, fixed length block truncation encoding may be adopted as now described. Referring to FIG. 7, an original image is firstly divided into a plurality of blocks. For each of pixels in one of the blocks, a gray scale value Lij is obtained. The thus obtained gray scale values $L_{ij}$'s are then subjected to coding procedures, wherein an average gray scale value La (1 byte), a gray scale deviation index $L_d$ (1 byte) and a quantized gray scale value for each pixel $L_{ij}$ (2 bits×16 pixels) are coded according a coding scheme shown in FIG. 8.

Figure 9:
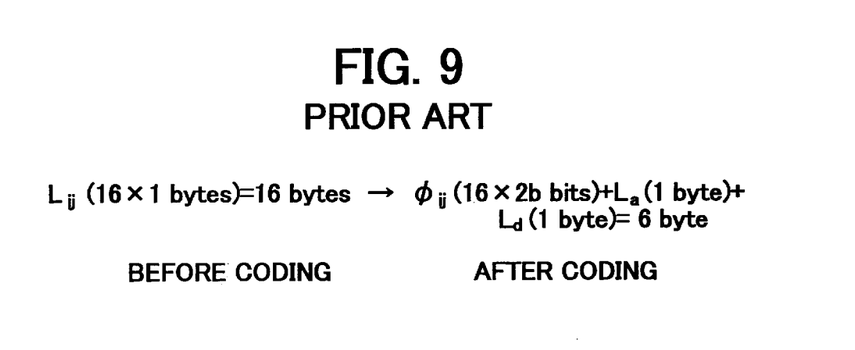
FIG. 9 illustrates a data compression process employed by the fixed length block truncation encoder.

As shown in FIG. 9, image data of one block which consist of 4×4 pixels and amounts to 16 bytes, can be reduced to 6 bytes by this coding procedures, which is three eighths of the original data volume.

Figure 10:
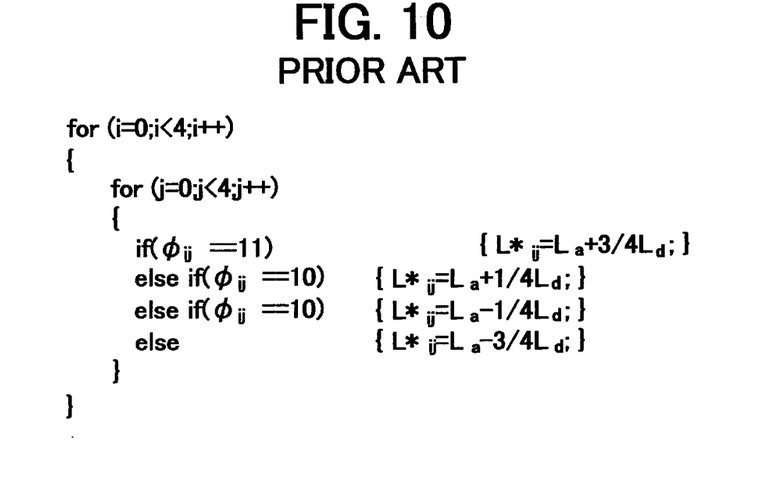
FIG. 10 illustrates a process for the fixed length block truncation decoding scheme.

The decoding procedures are carried out as illustrated in FIG. 10, wherein a gray scale value for each pixel $L^*_{ij}$ is calculated from the average gray scale value La, gray scale deviation index $L_d$, and quantized gray scale value for each pixel $\phi_{ij}$.

In conventional photocopying machines, there have been developed some multi-functional machines which have the capability of not only photocopying, but also printing and transmitting facsimile images, thereby combining the capabilities of three apparatuses in one. In such a system, the provision of an image storage unit is conceivable in order to carry out processing the digital image data, and it is preferable for such a unit to function as a temporary storage unit for printing or outputting facsimile transmission jobs.

As identified by the present inventor, image data which are conventionally outputted to printers or transmitted by facsimile apparatuses are largely in a binary format. As long as image data in the photocopying machine is in the binary format, the image recording unit having a binary compatible capability would be sufficient. However, if image data in photocopying machines are multiple valued, it becomes necessary for the image recording unit to have both a multiple valued capability for the photocopying operation and also a binary capability for the printing and facsimile transmission operations.

It may be noted at this point, that the multiple valued capability in the photocopying machines is conventionally utilized, since this capability is more advantageous from the viewpoint of high picture quality.

Also to be noted is that when a plurality of duplicated photocopies are produced from the image storage unit, a considerable volume of memory media is required. For example, when image data are stored in binary as blocks, as they are without the data compression, image data having a resolution of 400 dpi (or dot per inch) for one page of an A-4 size document amounts to approximately 2 MB (or megabytes) of memory space. Even for the case of multiple valued image data which are coded and stored according to the above-mentioned fixed length truncation encoding scheme, the image data amounts to approximately 6 MB of memory space for the A-4 size document with the resolution of 400 dpi. Therefore, these conventional image data processing procedures are not practical and not commercially advantageous for image data of many (e.g. tens of) pages of original documents to be stored.

SUMMARY OF THE INVENTION

The general purpose of this invention is to provide a digital multi-functional machine and processing procedures therefor, having most, if not all, of the advantages and features of similar employed machines and related procedures, while eliminating many of the aforementioned disadvantages of other machines and related procedures.

Accordingly, one object of this invention is to overcome the above-described limitations of conventional devices and methods. This and other objects are addressed by the present invention.

In one embodiment of the present invention, a digital multi-functional machine is provided, having at least one of a picture reading, a printing, and a facsimile transmission capability, and including a printer for making visible prints in response to a demand for image prints and prints of facsimile images, characterized in that the storage of image data may be carried out either in predetermined block units of pixels for binary image data, or in the form of data coded by a fixed length block truncation encoder by the same block units of pixels for multiple valued image data.

In another embodiment, the present invention provides a digital multi-functional machine additionally having a second data storage unit and a variable length encoding unit, characterized in that the variable length encoding unit is capable of coding, according to a variable length coding scheme, either binary image data previously stored in a predetermined block unit of pixels, or multiple valued image data previously encoded by a fixed length block truncation encoder by the block units of pixels.

In still another embodiment, the invention provides a digital multi-functional machine, wherein a second data storage unit is additionally provided for storing an amount of image data for a plurality of document pages.

In yet another embodiment of the invention, the invention provides a method of storing the image data in a digital multi-functional machine, either in a predetermined block unit of pixels for binary image data, or in the form of data encoded by a fixed length block truncation encoder by the block unit of pixels for multiple valued image data.

BRIEF DESCRIPTION OF THE DRAWINGS

These and other features of the present invention will become readily apparent in light of the following description and in reference to the drawings in which.

DESCRIPTION OF THE PREFERRED EMBODIMENTS

Referring now to FIGS. 1 through 6, there are shown by the way of example a digital multi-functional machine and its method, having the capability of photocopying, printing, and facsimile transmission, relating to the storage and processing of image data in multi-functional machines.

It is to be understood, however, that the invention is not expressly limited to these embodiments. For example, it is to be appreciated that the system configuration and methods of the invention described herein may be used with any form of other digital data processing procedures. Other embodiments will be apparent to those skilled in the art.

Embodiment 1

Figure 1:
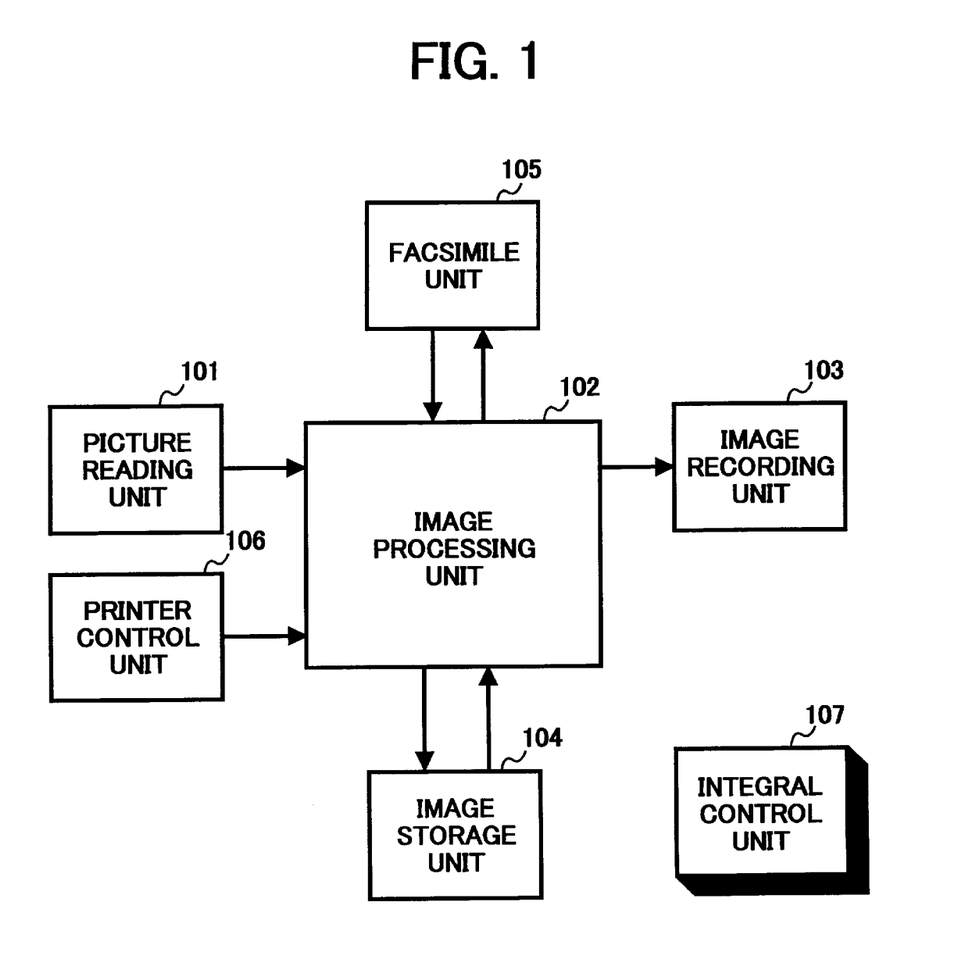
FIG. 1 is a block diagram illustrating a system configuration of a digital multi-functional machine in accordance with an embodiment of the present invention.

FIG. 1 is a block diagram illustrating a system configuration of a digital multi-functional machine in accordance with an embodiment of the present invention.

System Configuration

Referring to FIG. 1, a digital multi-functional machine 100 has a picture reading unit 101, a facsimile unit 105, a printer control unit 106, an image recording unit 103, an image processing unit 102, an image storage unit 104 and an integral control unit 107.

The picture reading unit 101 reads image data by scanning images of original documents, the facsimile unit 105 carries out a facsimile transmission/reception process, the printer control unit 106 carries out a printing process, the image recording unit 103 makes visible prints of inputted image data, the image storage unit 104 stores a plurality of image data read by the picture reading 101, and the integral control unit 107 controls respective sections of the digital multi-functional machine 100. The integral control unit 107 connects to the other system components by a bus, or other wiring scheme (not shown).

The present configuration of the digital multi-functional machine, has as its data input system the picture reading unit 101, facsimile unit 105 and printer control unit 106, while it has as its data outputting system the image recording unit 103 and facsimile unit 105.

Also in the present configuration, the image processing unit 102 is included in the machine so as to select an image processing procedure corresponding to an instruction dispatched by the data input/output system (such as by user-initiated command(s)). The image storage unit 104 is connected in turn to the image processing unit 102, and the integral control unit 107 is provided to perform system-level control of the respective units of the digital multi-functional machine 100.

Although a digital multi-functional machine and its image data processing that are utilized in the present invention are, in principle, based on a conventional system and method, it should be noted that the present invention is primarily characterized by the method of image processing carried out in the course of image data processing and storage in a digital multi-functional machine. In the following discussion, therefore, the procedure of the above-mentioned image data processing and storage will be featured and accompanied by somewhat brief descriptions on other units of the machine, illustrating their configuration and function.

Image Recording

Figure 2:
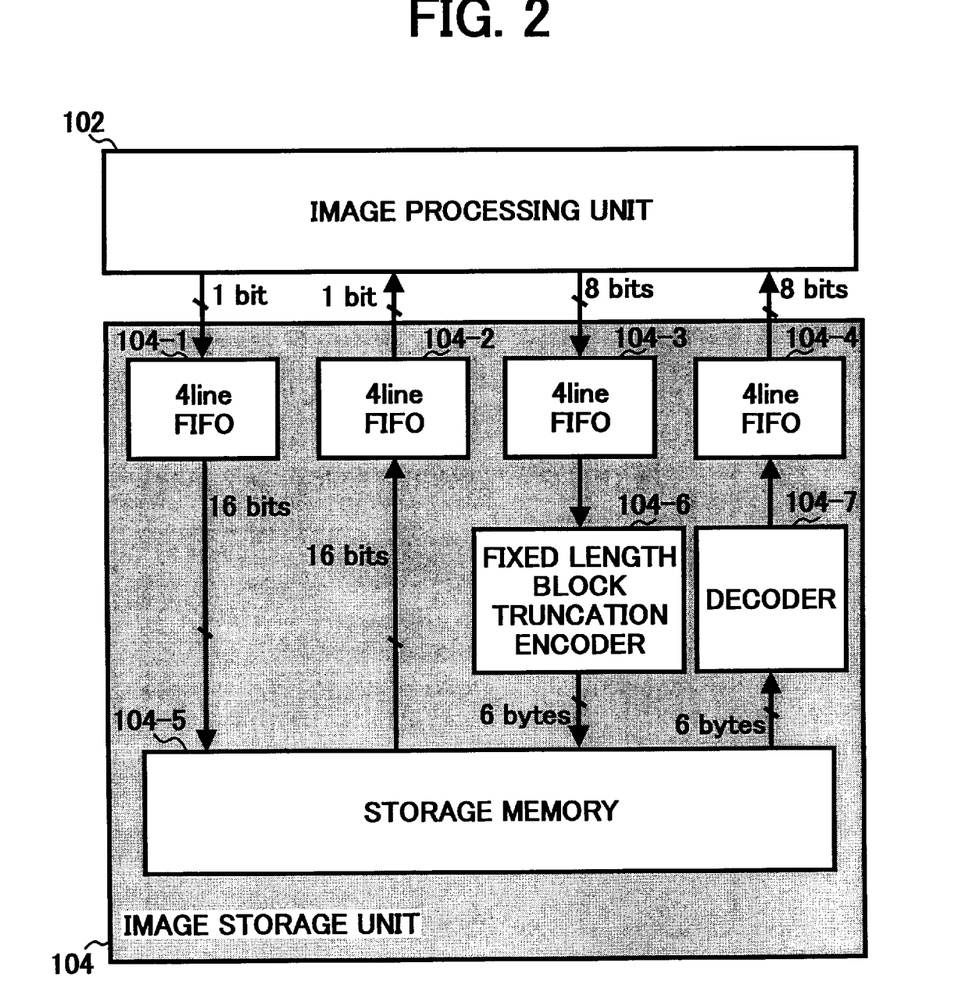
FIG. 2 is a block diagram of the image storage and image processing units for the machine shown in FIG. 1.

FIG. 2 is a block diagram illustrating aspects of a digital multi-functional machine in accordance with an embodiment of the present invention, including the image processing unit 102, an image storage unit 104 and an image data process.

Although image data are assumed to be stored in block units of 4×4 pixels in the following description, the block units are not necessarily limited to this size. The image storage unit 104 is provided with (1) four 4-line first-in first-out (FIFO) memories, 104-1 through 104-4, (2) a storage memory 104-5, (3) a fixed length block truncation encoder 104-6 and (4) a fixed length block truncation decoder 104-7.

Inputting Image Data

Referring to FIG. 2, when image data are in a binary format, these data are sequentially and serially output from the image processing unit 102 to the first FIFO memory 104-1 according to bits (i.e., by pixels) along the main scanning line. Once four lines are stored, the data in the four lines are sent to the storage memory 104-5 by a block unit of 4×4 pixels (i.e., 16 bits). When the image data are output from the storage memory 104-5, the image data are in a block unit of 4×4 pixels (or 16 bits), and subsequently fed to the second FIFO memory 104-2.

After being rearranged by the second FIFO memory 104-2 from the block unit of 4×4 pixels into a set of data along the main scanning line, the image data are sent in serial fashion to the storage memory 104-5.

By contrast, when image data are formatted in multi-level values (multiple valued) the image data are processed as follows. The multiple valued image data are output from the image processing unit 102 to the third 4-line FIFO memory 104-3 by 8 bit bytes (i.e., by pixels) along the main scanning line.

Upon completing the storage of data for four lines, the data are sent to the fixed length block truncation encoder 104-6 by a block unit of 4×4 pixels (i.e., 128 bits or 16 bytes). In the fixed length block truncation encoder 104-6, the image data are encoded according to the above-mentioned coding scheme, and resultant coded data, $L_a$, $L_d$ and $L_{ij}$ (6 bytes) are transferred to the storage memory 104-5.

Outputting Image Data

The image data are output from the storage memory 104-5 as follows. The coded data, $L_a$, $L_d$ and $L_{ij}$, are fed from the storage memory 104-5 to the fixed length block truncation decoder 104-7, wherein the aforementioned block truncation decoding is carried out. Decoded multiple valued image data in a block unit of 4×4 pixels are subsequently stored in the fourth FIFO memory 104-4.

After being rearranged by the fourth FIFO memory 104-4 from the block unit into a set of data along the main scanning line, the image data are sent by 8 bit bytes (or by pixels) to the image processing unit 102.

Embodiment 2

Figure 3:
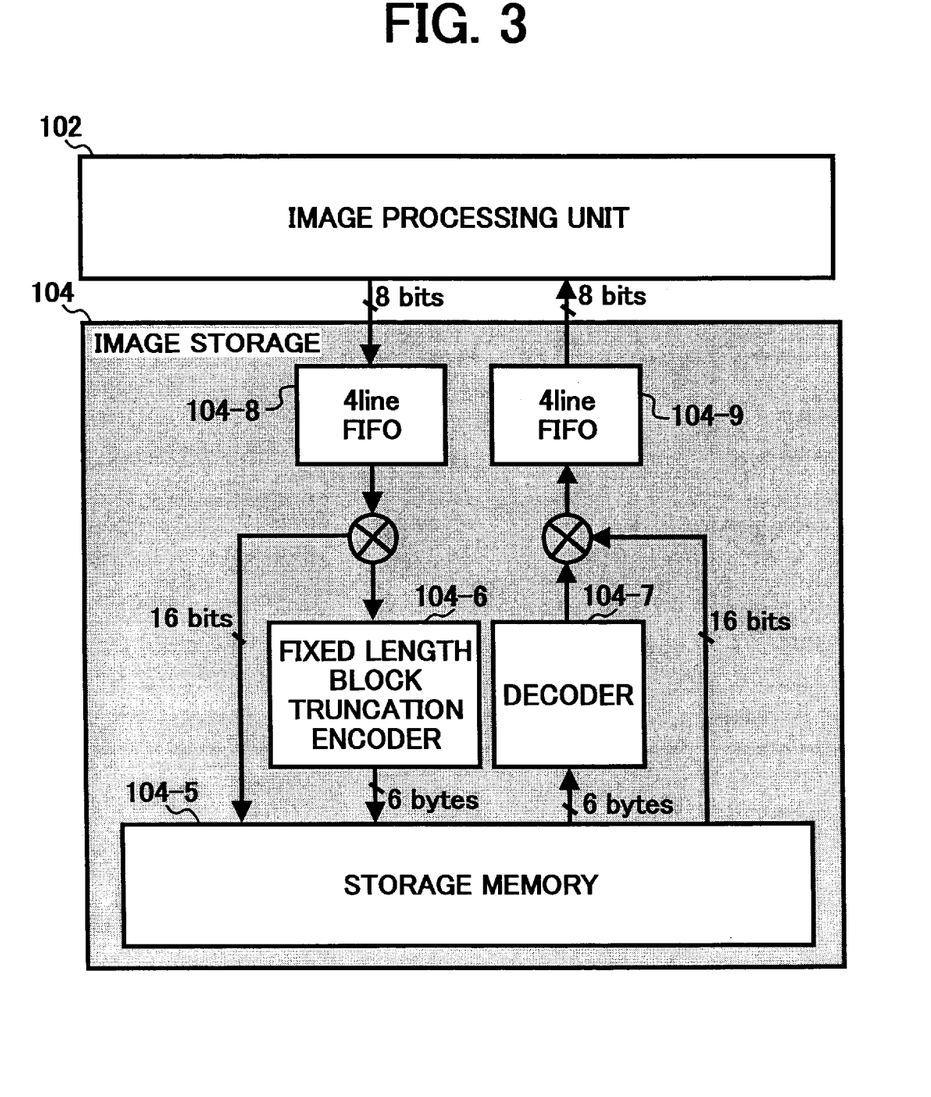
FIG. 3 is a block diagram of image storage and image processing units of a digital multi-functional machine in accordance with a second embodiment of the present invention.

FIG. 3 is a block diagram illustrating a system configuration of a digital multi-functional machine in accordance with another embodiment of the present invention.

Since the system configuration in this embodiment is practically similar to that for the previous embodiment, only pertinent portions of the system will be described in the following discussion. Also in the present embodiment, image data are assumed to be stored in a block unit of 4×4 pixels.

Image Recording

Referring to FIG. 3, the image data processing of the present embodiment will be carried out in a similar manner to the previous embodiment, with an exception being that 4-line FIFO memories are shared by both binary and multiple valued image data such that (1) the first and third FIFO memories 104-1, 104-3 are shared to constitute a FIFO memory 104-8, and similarly (2) the second and fourth FIFO memories 104-2, 104-4 are shared to constitute a FIFO memory 104-9.

Inputting Image Data

In the present system configuration, after being packed in 8 pixel units, the binary image data are exchanged between the image processing unit 102 and the image storage unit 104. Namely, binary image data are fed from the image processing unit 102 to the 4-line FIFO memory 104-8 by 8 bits (i.e., by 8 pixels) along the main scanning line. Upon completing the storage of data for four lines, the data are sent to the storage memory 104-5 by a block unit of 4×4 pixels (i.e., 16 bits).

By contrast, when image data are multiple valued, the image data are processed as follows. The multiple valued image data are output from the image processing unit 102 to the 4-line FIFO memory 104-8 by 8 bits (i.e., by pixels) along the main scanning line. Upon completing the storage of data for four lines, the data are sent by way of a switch (as shown, or other device that routes data) to the fixed length block truncation encoder 104-6 by a block unit of 4×4 pixels (i.e., 128 bits or 16 bytes). In the fixed length block truncation encoder 104-6, the image data are coded according to the above-mentioned coding scheme, and resultant coded data $L_a$, $L_d$ and $L_{ij}$ (6 bytes), are transferred to the storage memory 104-5.

Outputting Image Data

The binary image data are output from the storage memory 104-5 as follows. When the binary image data are output from the storage memory 104-5, the binary image data are in a block unit of 4×4 pixels (or 16 bits), and are subsequently fed to the FIFO memory 104-9 by way of the switch, as shown. After being reformatted by the FIFO memory 104-9 from the block unit into a set of data along the main scanning line, the binary image data are output in 8 bit sets to the image processing unit 102.

In contrast, coded mutiple valued image data are output from the storage memory 104-5 as follows. The coded data, $L_a$, $L_d$ and $L_{ij}$, are fed from the storage memory 104-5 to the fixed length block truncation decoder 104-7, wherein the aforementioned block truncation decoding is carried out. Decoded multiple valued image data in a block unit of 4×4 pixels are then stored in the FIFO memory 104-9 by way of the switch.

After being rearranged by the FIFO memory 104-9 from the block unit into a set of data along the main scanning line, the image data are sent in 8 bit sets (or by pixels) to the image processing unit 102.

Embodiment 3

Figure 4:
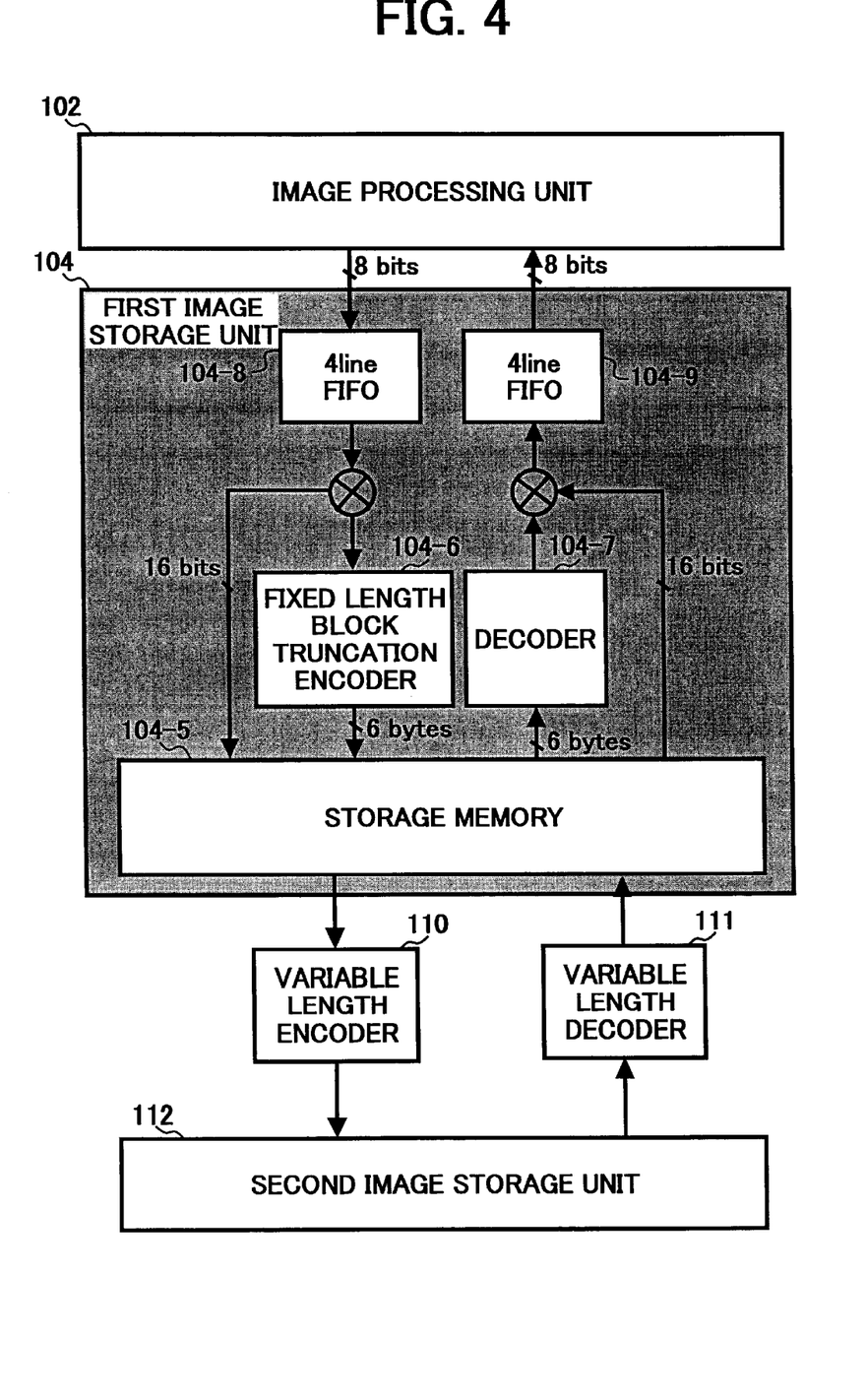
FIG. 4 is a block diagram of image storage and image processing units of a digital multi-functional machine in accordance with a third embodiment of the present invention.

FIG. 4 is a block diagram illustrating a system configuration of a digital multi-functional machine in accordance with a further embodiment of the present invention. Since aspects the system configuration in this embodiment are practically the same as that of the first embodiment, only pertinent, new features will be addressed in the following discussion. Also, in the present embodiment, image data are assumed to be stored in a block unit of 4×4 pixels.

In the system configuration for the present embodiment, in addition to the image storage unit 104 of the previous embodiment, further provided are a variable length encoder 110, decoder 111, and another image storage unit 112. To distinguish this image storage unit 112 from the image storage unit 104, the latter and the former image storage units will be hereinafter referred to as the second and first image storage units, respectively.

Image Storage Unit

As mentioned above, in the present system configuration, additional circuits include (1) the storage memory 104-5 connected to the second image storage unit 112 via the variable length encoder 110 and (2) the second image storage unit 112 connected to the storage memory 104-5 via the variable length decoder 111.

Since the image data processing in the image processing unit 102 and the image storage unit 104 will be carried out in a similar manner to the previous embodiment, the emphasis in the following discussion will be primarily on the variable length encoder 110, the variable length decoder 111 and the second image storage unit 112.

Storing Image Data

In the present embodiment, it is assumed that stored in the fixed length block truncation encoder of the first image storage unit 104 are (1) binary image data stored by a block unit or (2) multiple valued image data coded by the fixed length block truncation encoder and stored by the same block unit.

Upon storing one page of the above-mentioned data in the storage memory 104-5, the image data are fed to the variable length encoder 110, and subsequently coded according to the aforementioned coding scheme. As variable length encoding schemes, are known entropy coding methods such as arithmetic coding and Huffman coding.

The variable length coded image data are subsequently output from the variable length encoder 110, and stored in the second image storage unit 112. During the processing, the variable length coded image data are generally compressed and have a data volume less than original data. Accordingly, it becomes feasible for the second image storage unit 112 to store an amount of variable length coded image pages that exceeds original documents. This is true not only for binary image data but also for multiple valued image data.

Outputting Image Data

The variable length coded image data are output from the second image storage unit 112 as follows.

The variable length coded image data which are stored in the second image storage unit 112 are fed to the variable length decoder 111, and subsequently decoded to retrieve binary image data or coded multiple valued fixed length coded image data. These data are then decoded and transferred to the storage memory 104-5 in the image storage unit 104.

As indicated earlier, in reference to the first embodiment, these data are subsequently processed on a request as follows: (1) for binary image data, the image data are rearranged by the sixth 4-line FIFO memory 104-9 along the main scanning line and then fed to the image processing unit 102, and (2) for multiple valued image data, the fixed length coded image data are decoded in the fixed length block truncation decoder 104-7, rearranged by the sixth 4-line FIFO memory 104-9 and fed to the image processing unit 102.

It is to be noted that the scope of the image data processing in the present embodiment is not limited to the above description and that function and capability of the system configuration of the previous embodiments are also operable in the present embodiment as well.

With the digital multi-functional machine of the present invention, image data may be stored either in a predetermined block unit of pixels for binary image data, or in the form of being encoded by a fixed length block truncation encoder by the same block unit of pixels for multiple valued image data. Accordingly, this approach makes the storage of either binary image data or multiple valued image data in one image storage unit feasible in response to a request.

In addition, as described earlier, the present digital multi-functional machine further includes a second data storage unit and a variable length encoding unit, to thereby carry out (1) the coding by the variable length encoding unit, of either binary image data previously stored in a predetermined block unit of pixels or multiple valued image data previously coded by a fixed length block truncation encoder by the same block unit of pixels, and (2) the storage by the second data storage unit, of either of the binary or multiple valued image data coded by the variable length encoding unit.

By these processing procedures and associated structures and mechanisms, the volume of these binary or multiple valued image data may further be reduced. Furthermore, by compressing with the same variable length encoding scheme, both binary image data coded by the variable length encoding unit and multiple valued image data coded by the block unit may be processed in a similar manner, resulting in a simpler and thereby less expensive control system.

While the invention has been described with reference to the system and method disclosed, it is not confined to the details set forth, but is intended to cover such modifications or variations as may come within the scope of the following claims.

The entire contents of the priority document Japanese Patent Application No. 9-075795, filed in Japan on Mar. 27, 1997, is incorporated herein by reference.

What is claimed is:

1. A digital multi-function machine configured to perform at least one of a picture reading operation, a printing operation, and a facsimile operation, comprising:

a printer unit configured to produce a printed image on a print medium in response to receiving at least one of an image print command and a facsimile print command; and a data storage unit configured to receive image pixel data and to supply the image pixel data to the printer and having, a binary image storage mechanism configured to store binary image data in a predetermined block unit corresponding to the image pixel data, a signal line configured to transfer the binary image data of the predetermined block unit to a storage memory unit, and a multiple value image storage mechanism, positioned in parallel with said binary image storage mechanism and said signal line, having a fixed length block truncation encoder configured to encode multiple value image data into said predetermined block unit corresponding to another of the image pixel data and to store said encoded multiple value image data in said storage unit;

a variable length encoding unit being configured to encode, according to a variable length encoding scheme, at least one of said binary image data previously stored in said predetermined block unit; and said multiple value image data previously encoded by the fixed length block truncation encoder and stored in said predetermine d block unit.

2. The digital multi-functional machine of claim 1, wherein:

said storage memory unit is configured to store a predetermined volume of image data corresponding to a plurality of document pages.

3. A digital multi-functional machine configured to perform at least one of a picture reading operation, a printing operation, and a facsimile operation, comprising:

means for producing a printed image on a print medium in response to receiving at least one of an image print command and a facsimile print command; and means for receiving image pixel data, supplying the image pixel data to said means for producing a printed image, and for storing image data, including, means for storing binary image data in a predetermined block unit corresponding to the image pixel data, signal line means for transferring the binary image data of the predetermined block unit to a storage memory means, and means for encoding multiple value data, positioned in parallel with said means for storing binary image data and said signal line means, with a fixed length block truncation encoder means and storing resultant encoded data in said predetermined block unit corresponding to another of the image pixel data and to store said encoded multiple value image data in s aid storage memory means;

variable length encoding means for encoding, according to a variable length encoding scheme, at least one of said binary image data previously stored in said predetermined block unit and said multiple value image data previously encoded by the means for encoding multiple value data.

4. The digital multi-functional machine claim 3, wherein:

said storage memory means is for storing a predetermined volume of image data corresponding to a plurality of document pages.

5. A method for storing or processing image data for a digital multi-functional machine configured to perform at least one of a picture reading operation, a printing operation, and a facsimile operation, comprising the steps of:

receiving at least one of an image print command and a facsimile print command;

receiving image pixel data corresponding to an image to be printed on a print medium and supplying the image pixel data to a printer; and storing image data, including at least, storing binary image data, by a binary storage device, in a predetermined block unit corresponding to the image pixel data, transferring, by a signal line, the binary image data of the predetermined block unit to a storage memory unit, and encoding, by an encoder positioned in parallel with said binary storage device and said signal line, multiple value data with a fixed length block truncation encoder, storing resultant encoded data in said predetermined block unit corresponding to another of the image pixel data, and storing said encoded multiple value image data in said storage memory unit;

encoding, according to a variable length encoding scheme, at least one of said binary image data previously stored in said predetermined block unit and said multiple value image data previously encoded in said encoding multiple value data step.

6. The method of claim 5, wherein:

said step of storing data previously encoded includes storing the data encoded with said variable length encoding scheme in said storage memory unit having a capacity sufficiently large to accommodate data corresponding to a plurality of document pages.

* * * * *